Dec. 10, 1935.   H. A. SIEMUND   2,024,116
STICK HANDLING MECHANISM
Filed Aug. 8, 1934
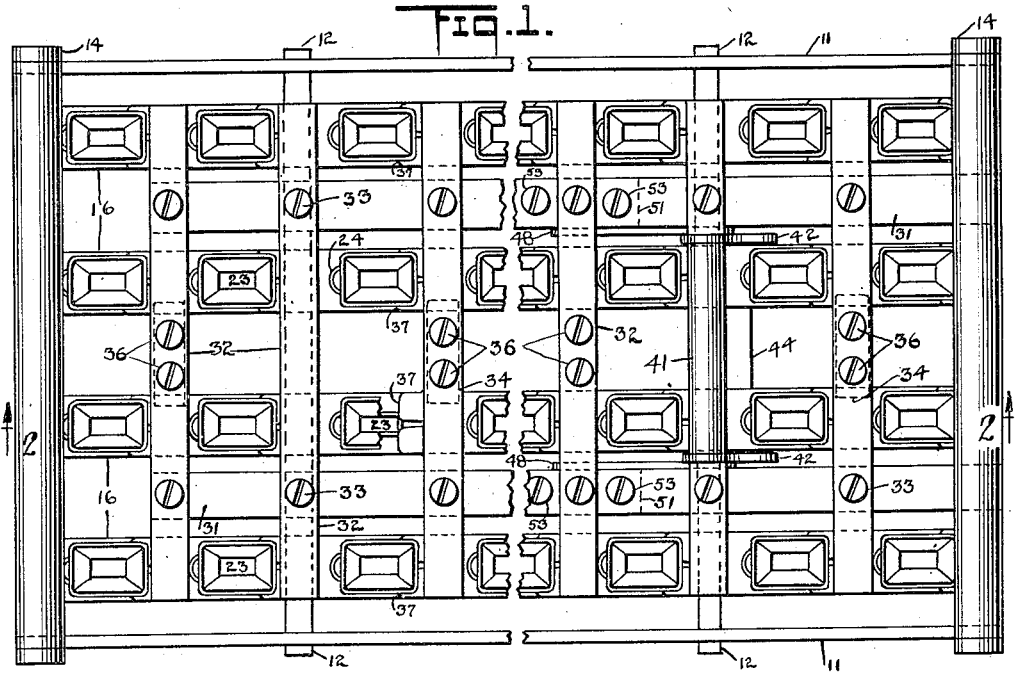
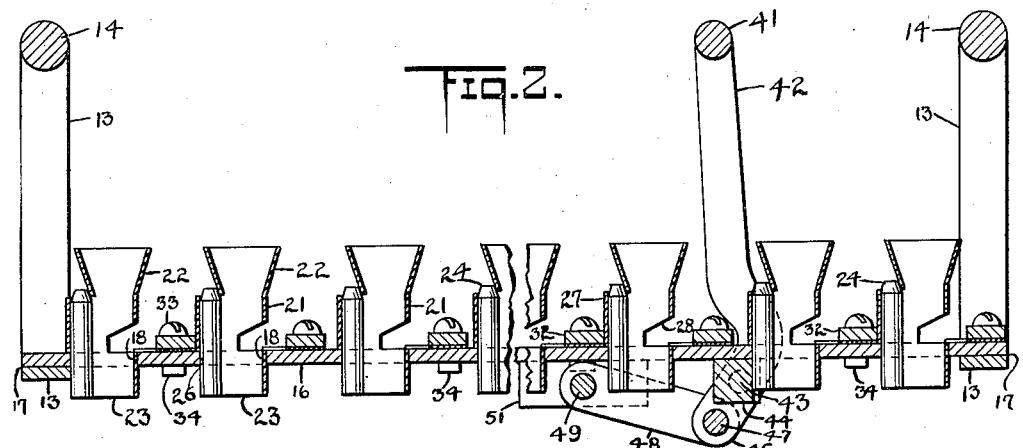
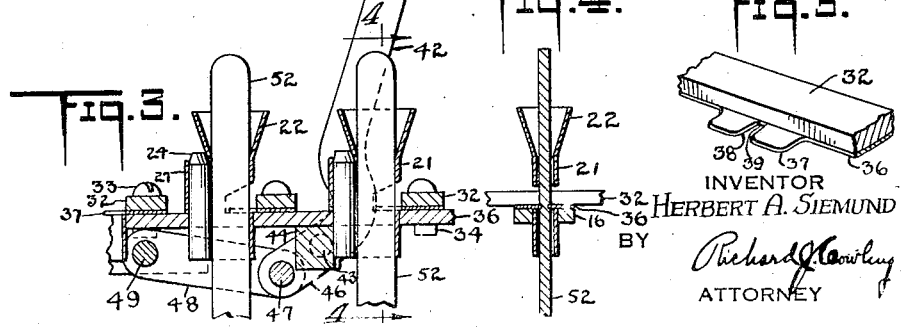
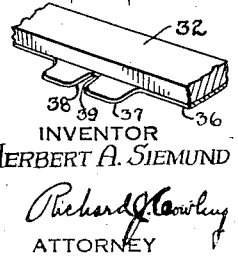
INVENTOR
HERBERT A. SIEMUND
BY
ATTORNEY Patented Dec. 10, 1935

2,024,116

UNITED STATES PATENT OFFICE 2,024,116

STICK HANDLING MECHANISM

Herbert A. Siemund, Chicago, Ill., assignor to Joe Lowe Corporation, Brooklyn, N. Y., a corporation of Delaware Application August 8, 1934, Serial No. 739,052

9 Claims. (Cl. 107—8)

The present invention relates to improvements in apparatus for simultaneously locking, manipulating and releasing a plurality of handle members, such as wooden handle sticks of the type used extensively in the candy and ice cream industries in the manufacture of stick confections, and it has particular relation to a portable type of carrier adapted to receive, position, lock, manipulate and release a plurality of such handle members simultaneously in a most efficient, sanitary and economical manner.

The invention is an improvement in the apparatus shown and described in United States Letters Patent No. 1,966,048, issued July 10, 1934, to Milton Schnaier, which apparatus is now being employed extensively in the ice cream industry in the manufacture of frozen stick confections by the process described in United States Letters Patent No. 1,505,592, issued August 19, 1934, to Frank W. Epperson.

It is well known that wooden handle sticks, because of their cellular structure, moisture, etc. tend to vary greatly in size, notwithstanding the precautions taken in their manufacture, and that with existing apparatus the clamping and manipulating ability of the carrier is dependent entirely upon one dimension of the handle member, which dimension is either the width or thickness of the handles depending upon the design of the carrier. Frequently handle members are sent out that do not come within the tolerance allowed in their manufacturing dimensions, but such handle members can only be distinguished from the standard sized handles by their failure to function properly in the carrier, causing considerable loss of time, production, etc. For example, if a handle member is too large, it will prevent the holder from securely engaging the remaining handle members therein, or, if a handle member is too small, the holder will fail to engage it and the operator is required to manually remove the inaccurate handle and replace it with one of proper size.

An object of the present invention is the provision of an improved clamping or stick engaging mechanism in a device of the character described, which will positively engage and lock a plurality of handle members positioned therein regardless of variations in their width or thickness dimensions, thereby obviating the difficulties now encountered with handle members which are not of a standard size.

Another object of the invention is the provision of a positive clamping or stick engaging mechanism for apparatus of the character herein described, which is not dependent upon the size of the handle members in only one dimension, but which is capable of clampingly engaging said handle members notwithstanding the fact that they may be of various sizes in either their width or thickness dimensions.

A further object of the invention is to provide a carrier of the character described with simple, inexpensive and removable blades, which may be easily and quickly replaced when worn or broken without requiring a rebuilding of the apparatus or replacement of the other blades therein.

Other and further objects and advantages of the invention reside in the detailed construction of the apparatus, which result in simplicity, economy and efficiency, and which will be apparent from the following description, wherein a preferred form of embodiment of the invention is shown, reference being had to the accompanying drawing, forming a part hereof, in which:

Fig. 1 is a top plan view of an apparatus constructed in accordance with my invention, with parts being broken away;

Fig. 2 is a longitudinal sectional view of the apparatus shown in Fig. 1, the same being taken substantially along the line 2—2 thereof, and showing the locking or clamping mechanism in its filling and/or releasing position;

Fig. 3 is a fragmentary sectional view of the apparatus shown in Fig. 2, showing the locking or clamping mechanism in its locking position with a handle member engaged therein;

Fig. 4 is a cross-sectional view of one of the handle receiving or guiding units of the apparatus, showing a handle member locked in position therein, the same being taken substantially along the line 4—4 of Fig. 3; and Fig. 5 is an enlarged fragmentary perspective view of one of the handle engaging blades of the clamping mechanism of the apparatus.

Referring now to the drawing, the apparatus consists of a main frame structure of elongated rectangular shape comprising spaced longitudinally extending bars 11 disposed in parallel relation and connected by transversely extending brace rods 12. Mounted upon each end of the main frame are upstanding rectangular end frames 13 provided with handle gripping members 14 to facilitate gripping and to permit the apparatus to be conveniently lifted and transported.

A plurality of spaced parallel bars 16 extend longitudinally of the main frame and are permanently secured to the base member of the end frames 13, as indicated at 17, by spot-welding or other suitable means Each of the bars 16 is provided at longitudinally spaced intervals with apertures 18, having handle receiving units 21 vertically mounted therein and projecting above and below the main frame for receiving handle members or sticks. The handle receiving units 21 are preferably tubular guides open along one edge and having their upper ends 22 flared outwardly to facilitate positioning handle members therein, and the opening 23 of the tubular guides 21 being preferably the approximate size and shape of the handle members to be manipulated by the apparatus.

In the apparatus which is illustratively shown in the drawing, the handles to be manipulated thereby are flat, and the tubular guides 21 are therefore rectangular in shape, similar to the shape or contour of the handles, having their relatively wide flat sides disposed longitudinally of the bars 16. The handle receiving unit includes a vertically disposed anchoring pin 24 extending through an opening 26 in the bar 16 and along the narrow open side of the guide member 21. The pin 24 is spot-welded or otherwise securely mounted in the bar 16. The upper end of the pin 24 extends through a yolk-like projection 27 extending horizontally outwardly from the back of the guide member 21 adjacent its flared end 22, thereby providing a rigid support for said guide member. The front portion of the guide members 21 is notched, as indicated at 28, to provide an opening for receiving a clamping or gripping blade adapted to engage the sides and one edge of the handle members position therein, as hereinafter more fully described.

A slidable frame structure consisting of a plurality of longitudinally extending bars 31 and transversely extending bars 32 connected by means of screw bolts 33 is carried by the main frame structure of the apparatus. The longitudinal bars 31 of the slidable frame structure are spaced to fit between the longitudinal bars 16 of the main frame structure, and the two structures are connected together in slidable relation by a plurality of spaced cleats 34 consisting of relatively short transversely extending bars connected by bolts 36 to the transversely extending bars 32 of the slidable frame structure, the ends of the bars forming the cleats 34 extending across the space between adjacent longitudinal bars 16 and beyond the marginal edges thereof to provide a guiding track for the slidable frame structure.

Each of the transverse bars 32 of the slidable frame structure is disposed immediately in front of a transverse row of handle receiving guide members 21. Clamped between each of the transverse bars 32 and the longitudinal bars 31 of the slidable frame structure is a blade member 36, having a plurality of knife members 37 projecting beyond the edges of the bars 32, said knife members 37 being provided with a bifurcation or slot 38 which may taper inwardly, forming a relatively sharp engaging or gripping edge adapted to engage two sides and in most instances the near edge of the handle member.

Longitudinal movement of the slidable frame structure is provided by means of a handle bail 41, having eccentrically curved side arms 42 extending below the main frame and pivoted at 43 in a block 44 mounted transversely of the main frame and connected by spot-welding or other means to the underside of adjacent parallel bars 16 thereof. The ends 46 of the side arms 42 are pivotally connected as at 47 to links 48 under the main frame structure, the opposite ends of said links 48 being pivotally connected, as indicated at 49, to lugs 51, which are affixed by bolts 53 or other suitable means to the underside of the movable bars 31 of the slidable frame structure.

It will be apparent from the foregoing description that the blades 36 may be quickly and conveniently removed and replaced by merely removing the transverse cross-bar 32, which is connected to the bars 31 by screw bolts 33. In the apparatus depicted in the drawing, each blade 36 has four knife-like projections 37 corresponding to the number of receiving units 21 extending transversely of the apparatus. The tapering slot 38 of the projection 37 adapts the clamping mechanism to firmly engage handle members of various thicknesses. In the event a handle member is positioned in the receiving unit 21 of less thickness than the narrowest portion of the slot 38 of the projection 37, the heel portion 39 of said slot will engage the edge of the handle member and wedge it tightly against the anchoring pin 24 of the receiving unit 21, thereby insuring a positive clamping engagement of the handle member regardless of variations in either its width or thickness dimensions, rendering the apparatus to use with handle members of greater variations in sizes than has heretofore been possible.

In operating the apparatus, the holder is positioned over a gauging frame or table (not shown) with its handle bail 41 moved in counter-clockwise direction as far as it will go, thereby moving the slidable frame structure carrying the knife members 37 out of the notches 28 of the guide members 21, and handle members or sticks 52 may then be dropped into the flared ends 22 of the guides 21. To lock the handle members or sticks 52 in fixed position, as shown in Figs. 3 and 4, the handle bail 41 is moved as far as possible in a clockwise direction, thereby moving the sliding frame structure until the knife-like members 37 enter the respective notches 28 and the slotted edges 38 press and engage the sides of the handle members 52 and the heel portion 39 engages the edge of the handle member thereby forcing it against the anchoring pin 24 of the receiving unit 21.

The apparatus may now be raised by means of the handles 14, manipulated and/or transported, as desired, with all of the handle members 52 firmly clamped or gripped into spaced fixed relation. When it is desired to release the handle members 52 from the apparatus, movement of the handle bail 41 in a counter-clockwise direction will withdraw the knives 37 from the guides 21, permitting the handle members 52 to fall out of the apparatus by gravitation.

Although I have only described in detail one form which the invention may assume, it will be apparent to those skilled in the art that the invention is not so limited, but that various modifications may be made therein without departing from the spirit thereof or from the scope of the appended claims.

What I claim is:

1. In a portable carrier consisting of a frame structure having handle receiving units mounted thereon in spaced relation, the combination with said handle receiving units of means including a blade member having a notch therein adapted to engage the sides of said handles for maintaining them in fixed position in said carrier.

2. In a portable carrier consisting of a frame structure having spaced handles for manipulating the same, and a plurality of handle receiving units mounted on said frame structure, the combination with said handle receiving units of means including a member having a slot therein adapted to engage the sides of said handles for maintaining them in fixed position in said carrier.

3. In a portable carrier consisting of a frame structure having spaced handles for manipulating the same, and a plurality of handle receiving units mounted thereon, the combination with said handle receiving units of means including a knife-like member having a tapering slot therein adapted to receive and engage the sides of said handles for maintaining them in fixed position in said carrier.

4. In a portable carrier consisting of a frame structure having spaced handles for manipulating the same, and a plurality of notched handle receiving units mounted thereon, the combination with said notched handle receiving units of means including a knife-like member having a bifurcated projection adapted to receive and engage the sides of said handles for maintaining them in fixed position in said carrier.

5. In a handle manipulating apparatus consisting of a frame structure having a plurality of spaced rows of handle receiving units mounted thereon in spaced relation, the combination with said rows of handle receiving units of means including a blade member adapted to be moved into and out of said row of handle receiving units, said blade member having a plurality of spaced bifurcated knives projecting therefrom and adapted to engage the sides of said handles in said receiving units and maintain them in fixed relation with respect to said carrier.

6. In a handle manipulating apparatus consisting of a frame structure having a plurality of spaced rows of handle receiving units mounted thereon in spaced relation, the combination with said rows of handle receiving units of means including a member adapted to be moved into and out of said row of handle receiving units, said member having a plurality of spaced projections extending therefrom and being provided with a tapering slot therein adapted to engage and receive the handles positioned in said receiving units and maintain them in fixed relation with respect to said carrier.

7. In a portable carrier consisting of a frame structure having handle receiving units mounted thereon in spaced relation, the combination with said handle receiving units of means including a removable blade member having a notch therein adapted to engage the sides of said handles for maintaining them in fixed position in said carrier.

8. In a handle manipulating apparatus consisting of a frame structure having a plurality of spaced rows of notched handle receiving units mounted thereon in spaced relation, the combination with said rows of handle receiving units of means including a removable blade member adapted to be moved into and out of said row of notched handle receiving units, said removable blade member having a plurality of spaced bifurcated knives projecting therefrom and adapted to engage the sides of said handles in said receiving units and maintain them in fixed relation with respect to said carrier.

9. In a portable carrier consisting of a frame structure having a handle receiving unit mounted thereon, the combination with said handle receiving unit of means including a blade member having a notch therein adapted to engage the side of said handle for maintaining it in fixed position in said carrier.

HERBERT A. SIEMUND.